(12) United States Patent
Khamis et al.

(10) Patent No.: US 10,621,499 B1
(45) Date of Patent: Apr. 14, 2020

(54) SYSTEMS AND METHODS FOR SEMANTIC UNDERSTANDING OF DIGITAL INFORMATION

(71) Applicant: MARCA RESEARCH & DEVELOPMENT INTERNATIONAL, LLC, Burbank, IL (US)

(72) Inventors: Mahmoud Azmi Khamis, Burbank, IL (US); Bruce Golden, Chicago, IL (US); Rami Ikhreishi, Raleigh, NC (US)

(73) Assignee: Marca Research & Development International, LLC, Burbank, IL (US)

( * ) Notice: Subject to any disclaimer, the term of this patent is extended or adjusted under 35 U.S.C. 154(b) by 1213 days.

(21) Appl. No.: 14/756,120

(22) Filed: Aug. 3, 2015

(51) Int. Cl.
*G06N 7/00* (2006.01)
*G06N 20/00* (2019.01)
*G06F 16/951* (2019.01)

(52) U.S. Cl.
CPC .......... *G06N 7/005* (2013.01); *G06F 16/951* (2019.01); *G06N 20/00* (2019.01)

(58) Field of Classification Search
None
See application file for complete search history.

(56) References Cited

U.S. PATENT DOCUMENTS

| | | |
|---|---|---|
| 5,325,293 A | 6/1994 | Dorne |
| 5,774,833 A | 6/1998 | Newman |
| 6,021,403 A | 2/2000 | Horvitz et al. |
| 6,233,570 B1 | 5/2001 | Horvitz et al. |
| 6,533,724 B2 | 3/2003 | McNair |
| 6,601,055 B1 | 7/2003 | Roberts |
| 6,687,685 B1 | 2/2004 | Sadeghi et al. |
| 7,113,943 B2 | 9/2006 | Bradford et al. |
| 7,200,435 B2 | 4/2007 | Ricci et al. |
| 7,213,174 B2 | 5/2007 | Dahlquist et al. |
| 7,222,079 B1 | 5/2007 | Seare et al. |
| 7,249,040 B1 | 7/2007 | Binns et al. |
| 7,301,093 B2 | 11/2007 | Sater et al. |
| 7,389,347 B2 | 6/2008 | Brodie et al. |
| 7,433,853 B2 | 10/2008 | Brockway et al. |
| 7,447,667 B2 | 11/2008 | Gong et al. |

(Continued)

FOREIGN PATENT DOCUMENTS

| | | |
|---|---|---|
| CN | 101625680 | 1/2010 |
| WO | WO2008137090 | 11/2008 |

OTHER PUBLICATIONS

Forman et al, Extremely Fast Text Feature Extraction for Classification and Indexing (Year: 2008).*

(Continued)

*Primary Examiner* — Li B. Zhen
*Assistant Examiner* — Mikayla Chubb
(74) *Attorney, Agent, or Firm* — Patterson Thuente Pedersen, P.A.

(57) ABSTRACT

A semantic engine including a group of functions or sub-engines configured to operate together to provide a complete analysis and understanding of digital information in order to provide results or subsequent actions. The semantic engine provide a set of algorithms, including a Naïve Bayes (Bayesian) algorithm, intelligent, self-learning semantic understanding algorithm, lexical analysis algorithm, word trimming algorithm, part-of-speech (POS) tagging algorithm, and textual inference algorithm.

15 Claims, 11 Drawing Sheets

(56) References Cited

U.S. PATENT DOCUMENTS

| | | | |
|---|---|---|---|
| 7,472,121 B2 | 12/2008 | Kothari et al. | |
| 7,529,685 B2 | 5/2009 | Davies et al. | |
| 7,536,357 B2 | 5/2009 | Boyer et al. | |
| 7,536,372 B2 | 5/2009 | Cox et al. | |
| 7,555,438 B2 | 6/2009 | Binns et al. | |
| 7,590,310 B2 | 9/2009 | Retterath et al. | |
| 7,606,405 B2 | 10/2009 | Sawyer et al. | |
| 7,624,030 B2 | 11/2009 | Feder et al. | |
| 7,650,321 B2 | 1/2010 | Krishnan et al. | |
| 7,669,871 B2 | 3/2010 | Watarai | |
| 7,650,272 B2 | 11/2010 | Przytula et al. | |
| 7,962,326 B2 | 6/2011 | Tsourikov et al. | |
| 8,312,067 B2 | 11/2012 | Elias et al. | |
| 8,459,680 B2 | 6/2013 | Chamberlain | |
| 8,666,928 B2 | 3/2014 | Tunstall-Pedoe | |
| 9,075,849 B2 | 7/2015 | Barney | |
| 2002/0002474 A1 | 1/2002 | Michelson et al. | |
| 2002/0082868 A1 | 6/2002 | Pories et al. | |
| 2004/0250166 A1 | 12/2004 | Dahlquist et al. | |
| 2005/0043922 A1 | 2/2005 | Weidl et al. | |
| 2005/0049988 A1 | 3/2005 | Dahlquist et al. | |
| 2005/0074834 A1 | 4/2005 | Chaplen et al. | |
| 2005/0118557 A1 | 6/2005 | Sumner, II et al. | |
| 2005/0234740 A1 | 10/2005 | Krishnan et al. | |
| 2005/0246306 A1 | 11/2005 | Evans-Beauchamp et al. | |
| 2007/0043761 A1 | 2/2007 | Chim et al. | |
| 2007/0118399 A1 | 5/2007 | Avinash et al. | |
| 2007/0192143 A1 | 8/2007 | Krishnan et al. | |
| 2008/0010522 A1 | 1/2008 | Uwatoko et al. | |
| 2008/0020379 A1 | 1/2008 | Agan et al. | |
| 2008/0033894 A1 | 2/2008 | Steck et al. | |
| 2008/0209269 A1 | 8/2008 | Brodie et al. | |
| 2008/0214928 A1 | 9/2008 | Rosales et al. | |
| 2008/0243799 A1 | 10/2008 | Rozich et al. | |
| 2008/0275731 A1 | 11/2008 | Rao et al. | |
| 2009/0254328 A1 | 10/2009 | Chbat et al. | |
| 2010/0324924 A1 | 12/2010 | Frederiksen | |
| 2011/0301982 A1 | 12/2011 | Green et al. | |
| 2012/0284200 A1 | 11/2012 | Pedersen | |
| 2013/0138665 A1 | 5/2013 | Hu | |
| 2013/0246046 A1* | 9/2013 | Fan | G06F 17/2785 704/9 |
| 2013/0282735 A1 | 10/2013 | Pedersen et al. | |
| 2013/0339202 A1 | 12/2013 | Zhao et al. | |
| 2014/0032574 A1 | 1/2014 | Khan | |
| 2015/0370901 A1 | 12/2015 | Sobeck et al. | |
| 2015/0371203 A1 | 12/2015 | Plunkett et al. | |
| 2017/0300470 A1 | 10/2017 | Khamis et al. | |

OTHER PUBLICATIONS

Jijkoun et al, Recognizing Textual Entailment: Is Word Similarity Enough? (Year: 2005).*

Navigli et al, BabelNet: The automatic construction, evaluation, and application of a wide-coverage multilingual semantic network (Year: 2012).*

Titov et al, A Bayesian Model for Unsupervised Semantic Parsing (Year: 2011).*

Li et al, Sentence Similarity Based on Semantic Nets and Corpus Statistics (Year: 2006).*

Galitsky et al, Inferring the semantic properties of sentences by mining syntactic parse trees (Year: 2012).*

Journal of Ahima, American Health Information Management Association.© 2017, as accessed on Feb. 15, 2018. http://journal.ahima.org/.

Socher et al., Deep Learning for Natural Language Processing (without Magic)., 2013, as accessed on Feb. 15, 2018. https://nlp.stanford.edu/courses/NAACL2013/.

Berkely CS 188: Introduction of Artificial Intelligence, as accessed on Feb. 15, 2018.http://inst.eecs.berkeley.edu/~cs188/fall/lectures.html.

Healthcare IT News.© 2017, as accessed on Feb. 15, 2018 http://www.healthcareitnews.com/.

EHR Intelligence.© 2012-2018, as accessed on Feb. 15, 2018 https://ehrintelligence.com/.

Hit Consultant (HealthCare Technology) as accessed on Mar. 7, 2018. http://hitconsultant.net/.

Tu Wien. Vienna University of Technology. (Dissertation "A Comparative Analysis of System Dynamics and Agent-Based Modelling for Health Care Reimbursement Systems", Oct. 2014. English abstract provided.

Capterra. Claims Processing Software as accessed on Feb. 26, 2018 https://www.capterra.com/claims-processing-software/.

Clark, Bloomberg Technology., "I'll be back: The Return of Artificial Intelligence", Feb. 3, 2015.

Iskandarani A novel approach to decision making of Mined Data using Dynamic Snapshot Pattern Recognition Algorithm (DS-PRA). TMLA. vol. 2, Issue 4. Publication date Aug. 3, 2014.

Innography, A CPA Global Company. Advanced Analytics as accessed on Feb. 28, 2018,© 2018 https://www.innography.com/why-innography/advanced-analytics.

Cascini. "Computer-Aided Innovation (CAI)", IFIP $20^{th}$ World Computer Congress, Proceedings of the $2^{nd}$ Topical Session of Computer-Aided, Innovation. Sep. 7-10, 2008.

Ye et al., Large Scale Text Analysis, "Electrical Engineering and Computer Sciences University of California at Berkeley". May 15, 2015. Tech Report No. UCB/EECS-2015-136.

Text Comparison Tools for Assisting with Patent Claims Analysis, Patinfomatics, LLC.© 2017 as accessed on Feb. 28, 2018 https://patinformatics.com/text-comparison-tools-for-assisting-with-patent-claims-analysis/.

Guo et al., "Ranking Structured Documents: A Large Margin Based Approach for Patent Prior Art Search", Department of Computer Science. 2009.

Harris et al., SpringerLink. "Using Classification Code Hierarchies for Patent Prior Art Searches". Abstract only. vol. 29 (2011).

Fu et al., "Design-by-analogy: experimental evaluation of a functional analogy search methodology for concept generation improvement" 2014.

http://www.intellogist.com/wiki/Compare:Patent_Search_System © 2009. Patent Search System.

Amazon Weblink to Costa-Jussa et al., "Hybrid Approaches to Machine Translation Theory and Applications of Natural Language Processing" $1^{st}$ ed. 2016 edition https://www.amazon.com/Approaches-Translation-Applications-Language-Processing/dp/3319213105/ref=sr_1_11?s=books&ie=UTF8&qid=1456415245&sr=1-11&keywords=semantic+information+processing.

Amazon Weblink to Cardoso et al., "Semantic Keyword-based Search on Structured Data Sources: First Cost Action IC1302 International Keystone Conference, IKC 2015,Comibra, Portugal" $1^{st}$ ed. 2015 Edition. https://www.amazon.com/Semantic-Keyword-based-Search-Structured-Sources/dp/3319279319/ref=sr_1_62?s=books&ie=UTF8&qid=1456415489&sr=1-62&keywords=semantic+information+processing.

Amazon Weblink to Lakshmi et al., "Computational Intelligence Techniques in Health Care" $1^{st}$ed. 2016 Edition. https://www.amazon.com/Computational-Intelligence-Techniques-SpringerBriefs-Technology/dp/9811003076/ref=sr_1_8?s=books&ie=UTF8&qid=1456415083&sr=1-8&keywords=semantic+information+processing.

Amazon Weblink to "Ionescu et al., Knowledge Transfer between Computer Vision and Text Mining: Similarity—based learning approaches" (Advances in Computer Vision and Patterson Recognition). $1^{st}$ ed. 2016 Edition. https://www.amazon.com/Knowledge-Transfer-between-Computer-Vision/dp/3319303651/ref=sr_1_27?s=books&ie=UTF8&qid=1456415406&sr=1-27&keywords=semantic+information+processing.

Amazon Weblink to "Supnithi et al., Semantic Technology: 4th Joint International Conference", $2015^{th}$ Edition (Nov. 9-11, 2014) https://www.amazon.com/Semantic-Technology-International-Conference-Thailand/dp/3319156144/ref=sr_1_2?s=books&ie=UTF8&qid=1456433017&sr=1-2&keywords=Semantic+Technology%3A+Joint+International+Conference%2C+JIST+2015.

Moehrle et al., "Measuring textual patent similarity on the basis of combined concepts: design decisions and their consequences", Abstract. Published online Mar. 13, 2012.

(56) References Cited

OTHER PUBLICATIONS

Sweetwiki: A Semantic Wiki Abstract vol. 6, No. 1 (2008) http://www.websemanticsjournal.org/index.php/ps/article/view/138.
Sheth et al, "Semantic Content Management for Enterprises and the Web" (2002). IEEE Internet Computing.
Starc et al., "Joint learning of ontology and semantic parser from text", *Jozef Stefan International Postgraduate School, Slovenia*. Nov. 2015.
Collobert et al., "Natural Language Processing (Almost) from Scratch", *Journal of Machine Learning Research* 12 (2011) 2493-2537.
Collobert et al., "A Unified Architecture for Natural Language Processing: Deep Natural Networks with Multitask Learning", NEC Labs America. 2008.
Sheth et al., "Semantic Content Management for Enterprises and the Web" IEEE Internet Computing Jul./Aug. 2002.
Sierra et al., "Machine Learning inspired approaches to combine standard medical measures at an Intensive Care Unit", Dept. of Computer Science and Artificial Intelligence. 1999.
Sierra et al., "Bayesian networks in biomedicine and health-care", *Artificial Intelligence in Medicine* 2004.
Herskovits et al., "Applications of Bayesian Networks to Health Care", Technical Report NSI-TR-1997-02. Mar. 27, 1997.
Wang et al.,"$R^3$ Reinforced Ranker-Reader for Open-Domain Question Answering, School of Information System, Singapore Management University", Nov. 21, 2017.
"Google open-sources natural language understanding tools", http://www.kurzweilai.net/google-open-sources-natural-language-understanding-tools?utm_source=KurzweilAI+Daily+Newsletter&utm_campaign=018a562279-UA-946742-1&utm_medium=email&utm_term=0_6de721fb33-018a562279-282137525 May 11, 2016.
How Google Plans to Solve Artificial Intelligence. MIT Technology Review © 2018, as accessed on Feb. 13, 2018, https://www.technologyreview.com/s/601139/how-google-plans-to-solve-artificial-intelligence/#/set/id/601159/.
Teach Yourself Deep Learning with TensorFlow and Udacity. Google Research Blog. Jan. 21, 2016. Vanhoucke, Vincent https://research.googleblog.com/2016/01/teach-yourself-deep-learning-with.html.
Now AI Machines Are Learning to Understand Stories. MIT Technology Review.© 2018, as accessed on Feb. 13, 2018.
Colucci et al., "Concept abduction and contraction for semantic-based discovery of matches and negotiation spaces in an e-marketplace", Semantic Scholar. (2004) https://www.semanticscholar.org/search?q=semantic%20searching%20of%20e-discovery&sort=relevance.
How Meta's Literature Discovery Engine Works.© 2018, as accessed on Feb. 13, 2018. https://vimeo.com/144358069.
Lawmoose, Lawsaurus and Laugment, *What Comes After the Search Engine? Semantic Network-Based Lawyer Augmentation*, Jun. 25, 2015.
Kurzweil Accelerating Intelligence, *The Top A.I. Breakthroughs of 2015*, available at http://www.kurzweilai.net/the-top-ai-breakthroughs-of-2015?utm_source=KurzweilAI+Daily+Newsletter&utm_campaign=1057a4f9d8-UA-946742-1&utm_medium=email&utm_term=0_6de721fb33-1057a4f9d8-282137525, Dec. 29, 2015.
Application and File History for U.S. Appl. No. 15/488,708 filed Apr. 17, 2017, inventors Khamis et al., as available on PAIR at www.uspto.gov.

\* cited by examiner

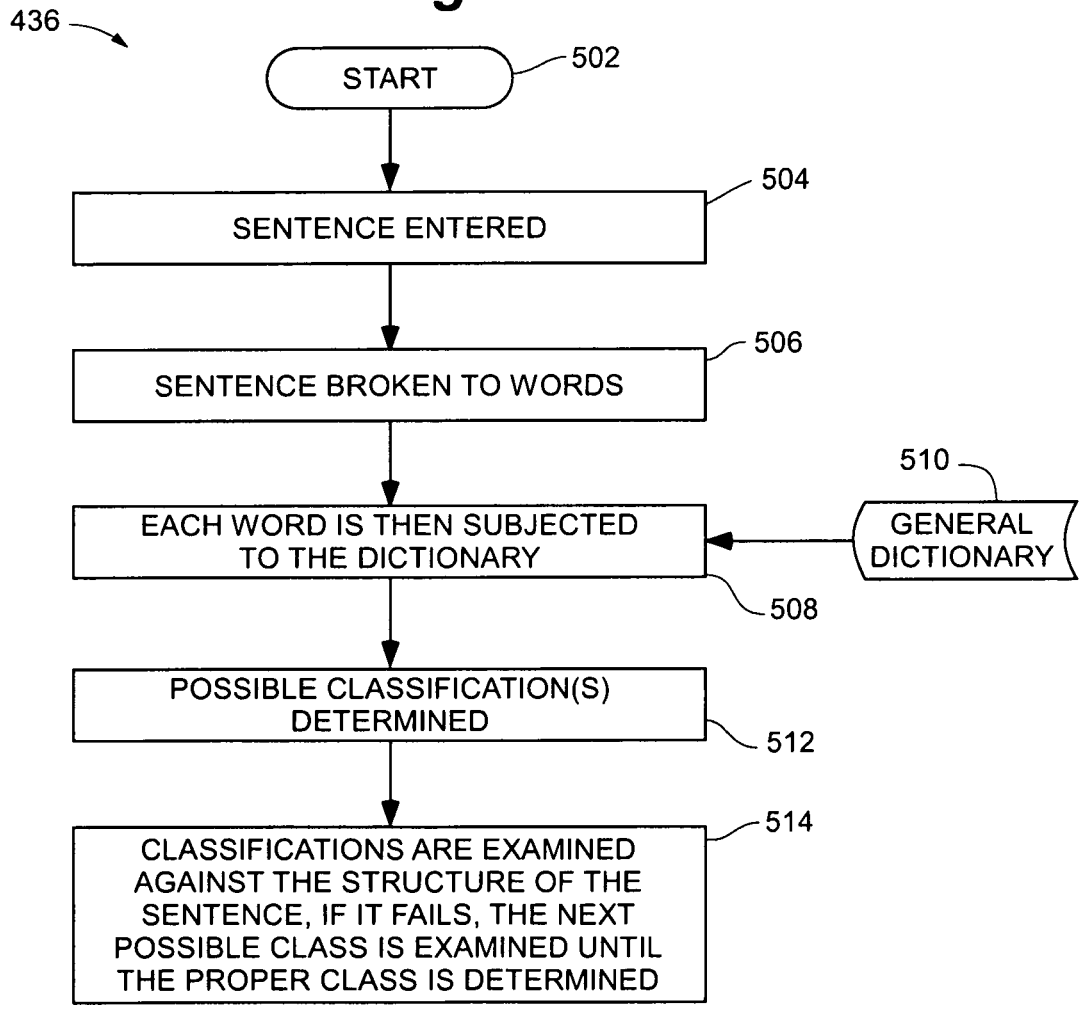

RIGHT-DEEP TREE

BUSHY TREE

SYSTEMS AND METHODS FOR SEMANTIC UNDERSTANDING OF DIGITAL INFORMATION

RELATED APPLICATIONS

This application is related to co-pending application Ser. No. 14/756,121, filed Aug. 3, 2015, entitled, "Systems and Methods for Patent Reference Comparison in a Combined Semantical-Probabilistic Algorithm," and application Ser. No. 14/756,119, filed Aug. 3, 2015, entitled, "Artificial Intelligence System for Healthcare Reimbursement," which are fully incorporated herein in their entireties by reference.

TECHNICAL FIELD

Embodiments relate generally to digital information, and more particularly, to systems and methods for semantically analyzing digital information.

COMPUTER PROGRAM LISTING APPENDIX

The following listing is a computer program listing appendix submitted herewith on compact disc (CD) in duplicate and incorporated by reference herein in their entirety. The total number of CDs is two; one CD labeled "Copy 1," and a duplicate CD labeled "Copy 2."

BACKGROUND

Historically, in order to understand or appreciate a particular topic, one would need to read a myriad of resources and manually synthesize the contents of the resources. Conclusions or theories or broadly-categorized "results" could then be made based on this synthesis. This, of course, is a time-intensive and user-specific process.

However, as digital information becomes more and more prevalent and an increasing number of resources become available in a digital format in online databases, there is an opportunity to automate the reading and understanding of resources in order to derive useful knowledge across a wide variety of topics and for any generic user.

In one example described in "Semantic Content Management for Enterprises and the Web," by Sheth et al., a semantic search utilizing a hierarchical arrangement of categories for annotating or tagging content is disclosed. Two components for semantic analysis are disclosed—a definitional component and an assertional component. Metadata can also be utilized in classification. This approach therefore uses tagging techniques by looking at specific words contained within the text (keywords) and tags the text based on the availability and frequency of these keywords. Such keyword tagging is often not an accurate depiction of the text.

In another example, described in U.S. Patent Application Pub. No. 2014/0032574 to Kahn, entitled, "Natural Language Understanding Using Brain-Like Approach: Semantic Engine Using Brain-Like Approach (SEBLA) Derives Semantics of Words and Sentences," a semantic engine utilizing Natural Language Understanding (NLU) to solve semantics and its sub-problems is disclosed. Each word and representations of the respective words and rules to combine them are implemented. A knowledge framework can be learned or refined for a specific domain using respective text corpora. This approach does not clarify the overall meaning and concepts in a given text. Rather, it detects the domain of the input text, but it does not get to the specifics of the meaning and understanding of the sentence to the word level.

In another example, described in U.S. Patent Application Pub. No. 2013/0138665 to Hu et al., entitled, "Methods of Evaluating Semantic Differences, Methods of Identifying Related Sets of Items in Semantic Spaces, and Systems and Computer Program Products for Implementing the Same," a method of evaluating semantic differences between a first item in a first semantic space and a second item in a second semantic space using a nearest neighbors analysis is disclosed. This approach therefore counts words and compares word vectors. As a result, is flawed in that if three or more words have similar meanings but they are different in spelling, the Hu approach will not recognize the relation of these words.

Therefore, there is a need for systems and methods that provide real-time, accurate, and verifiable semantic analysis of digital information for varying resource sizes. There is further a need to distill the resulting analyses into results or subsequent actions based on the analysis.

SUMMARY

Embodiments described or otherwise contemplated herein substantially meet the aforementioned needs. Embodiments comprise a semantic engine including a group of functions configured to operate together to provide a complete analysis and understanding of digital information in order to provide results or subsequent actions. Particularly, embodiments provide a set of algorithms, including a Naïve Bayes (Bayesian) algorithm, intelligent, self-learning semantic understanding algorithm, lexical analysis algorithm, word trimming algorithm, part-of-speech (POS) tagging algorithm, and textual inference algorithm, as well as other associated algorithms and methods, as will be described.

According to an embodiment, a semantic engine as an automated and computerized process and/or apparatus is configured to classify and extract concepts from a digital resource or a set of digital resources. The semantic engine is further configured to provide inference results based on a semantic understanding of the digital resource or a set of digital resources. The results can be applied to a particular application or field. In an embodiment, the semantic engine is configured to provide any number of outputs. For example, embodiments are configured to determine a classification of the entire domain chain (e.g. global to specific). Embodiments are configured to determine concepts found in the digital resource or a set of digital resources. Embodiments are configured to determine one or more inferences, including, for example, how the body of matter is related within the context or application of the engine. Embodiments are configured to deduce useful, applicable, and pragmatic analyses from the knowledge obtained, which can in turn, facilitate intuitive and validated predictions. Embodiments are configured to extract answers to one or more questions from the digital material. Embodiments are configured to generate or provide abstracts for the digital material compilation.

According to an embodiment, a genericized semantic engine comprises sub-engines or sub-routines configured to classify an input text. Embodiments further comprise sub-engines or sub-routines configured to extract the concepts found in the text, Embodiments further comprise sub-engines or sub-routines configured to rank the concepts to find the most apparent (weighted) concept that is the "topic" of the text. Embodiments further comprise sub-engines or sub-routines configured to determine sub-topics. For example, if sentences describe a particular concept, the sentences that follow can often describe sub-topics. Embodiments further comprise sub-engines or sub-routines configured to determine an inference between text inputs. In natural language, such an inference can provide answers to a given question for the material, according to an embodiment. Embodiments further comprise sub-engines or sub-routines configured to provide an abstract of the input text.

In an embodiment, an integrated process (semantic engine) combines multiple approaches, processes, and techniques, to determine the semantic meaning and understanding for an input text. The semantic engine can comprise a general text classification sub-process. In an embodiment, the general text classification sub-process utilizes a Naive Bayes Algorithm (Bayesian Logic) based on the commonly updated contents of WIKIPEDIA to create general classifications. In one example, all of the articles written in English are obtained. In other embodiments, subsets or less than all of the articles written in English and/or articles written in other languages, and/or translations of such articles written in other languages can be obtained. The general text classification sub-process can then process the articles to obtain one or more categories. The general text classification sub-process can then generate a link between the articles and full chain categories. For example, in an embodiment, full chain categories included 20 levels. With over 1,800,000 articles, over 17,000 categories were derived.

Bayesian logic can subsequently be applied. For example, after obtaining and linking the respective categories to their respective articles, a Bayesian engine can be applied to the categories and articles to be effectively "trained" for the categories and their respective articles. In an embodiment, the Bayesian engine is a sub-component of the general text classification sub-process. In another embodiment, the Bayesian engine is a standalone component. Considering again the example provided above, after "training," the Bayesian engine is capable of determining the categorization of a given text to one of the more than 17,000 categories that were obtained from WIKIPEDIA. In still other embodiments, the general text classification sub-process can comprise an engine other than a Bayesian engine. For example, the engine can comprise any suitable logic applied to decision making and inferential statistics for probability inference.

In a feature and advantage of embodiments, the general text classification sub-process can be configured to save or store any intermediate categories or classifications that were determined for an article undergoing through the classification process. As a result, every article includes a chain of categories that begin with the direct parent of the article, and ascends to reach the grandparent for the article. Such inheritance chaining is used to relate the articles providing similarities to be subsequently utilized by the semantic engine.

In an embodiment, an article can appear in multiple categories in lower-level classifications because categories can involve multiple aspects that do not necessarily fall within the main (grandparent) category. This is useful because this relates the article to multiple categories in terms of relevance. For example, if the article is classified as law, it can also be sub-classified as humanities, society, and so forth, so that depth is added to the meaning of a classification. As a result, the Bayesian engine can classify a given text providing not only a main category classification, but also sub categories classifications, where applicable.

In another feature and advantage of embodiments, the semantic engine comprises a sentence determination sub-engine. Generally, but not necessarily, sentences end with a period, a question, or an exclamation mark. The sentence determination sub-process is configured to determine such sentence endings. In an embodiment, sentences that do not fall into this rule are analyzed by the sentence determination sub-engine to determine when the sentence ends based on two factors: the completion of the meaning, and the structure of the sentence.

In another feature and advantage of embodiments, the semantic engine can comprise a part-of-speech (POS) determination sub-engine. In an embodiment, the POS determination engine is configured to tag words inside of the text. For example, the POS determination sub-engine can break each word in the sentence to the classes of speech such as verb, noun, adjective, etc. In embodiments, this data or determination is stored by the semantic engine.

After POS information is determined, the POS determination sub-engine can further examine the sentence to determine the type of the sentence. For example, the POS determination engine can determine a declarative, imperative, interrogative, or exclamatory sentence. In an embodiment the determination is made by the order of the classes of the POS within the sentence.

According to embodiments, POS tagging and sentence determination facilitates the semantic understanding process because such processes can help determine the type of sentence. For example, if the sentence is declarative, the sentence has a higher ranking/weight while processing the inference than being exclamatory or imperative. The semantic engine can be configured to examine this information and is programmed to understand that declarative sentences often include higher-level or more valuable information.

In another feature and advantage of embodiments, the semantic engine comprises a word-stemming sub-engine. For example, the word-stemming sub-engine can be configured to stem words to their original case. In an embodiment, the word-stemming sub-engine can preserve the tense and count of the word. The stemming sub-engine returns the word to its singular present form to make it easier to extract the meaning of the word from the integrated dictionaries. In another feature and advantage of embodiments, the semantic engine can be configured to be operably coupled to any suitable dictionary or thesaurus to obtain word meanings and alternatives. For example, the semantic engine can be operably coupled to the WordNet dictionary. In embodiments, such linking or coupling facilitates not only the correct understanding and meanings of words, but also allows for the determination of the relation of two independent sentences that are used in the inference sub-process, as will be described.

In another feature and advantage of embodiments, the semantic engine can be configured to determine actions and reactions from the WIKIPEDIA data using the same articles from the general text classification sub-process. In an embodiment, such determination can be made by a determination sub-engine. This determination provides data on the sentences that follow an exact structure to be used as an action, (e.g. a question, or an introductory sentence, etc.) and those that can be used as a reaction (e.g. an answer, a conclusion, etc.).

In another feature and advantage of embodiments, the semantic engine can comprise an inference sub-engine. In an embodiment, the inference sub-engine combines the other aforementioned subcomponents to derive an allocation between the sentences. In an embodiment, a combination of these parts and processes are utilized to generate the output of the inference sub-process functions. For example, this can be executed by "reading" the concepts created by the other sub-processes of the semantic engine, and then applying an inference algorithm to determine how close the concepts are to each other. Embodiments can include a determination of a domain of the two concepts, the meaning of the individual words, and the equated overall meaning for the concepts and sentences.

In another feature and advantage of embodiments, the semantic engine can comprise a reasoning sub-engine. For example, the reasoning sub-engine can be configured to combine the logical inheritance between the main domains and their sub-domains (in the fashion of a parent→child or a genus→species) and the concepts extracted from the input text to genuinely link the concept to the nearest domain level (in terms of the entire patent/child series) to identify the exact sub-domain/category the concept would fall into. According to an embodiment, the reasoning sub-engine determines the chain of the domain/sub-domain down to the specific or individual category. This process is implemented using the inference sub-engine as the chain compares the sub-categories of the main domain with the concepts contained in the given text. The system then moves down the line with the sub-sub-categories until a satisfactory result is reached.

The above summary is not intended to describe each illustrated embodiment or every implementation of the subject matter hereof. The figures and the detailed description that follow more particularly exemplify these embodiments.

BRIEF DESCRIPTION OF THE DRAWINGS

Subject matter hereof may be more completely understood in consideration of the following detailed description of various embodiments in connection with the accompanying figures, in which:

FIG. 5 is a flowchart of a method for part-of-speech tagging, according to an embodiment.

Figure 1:
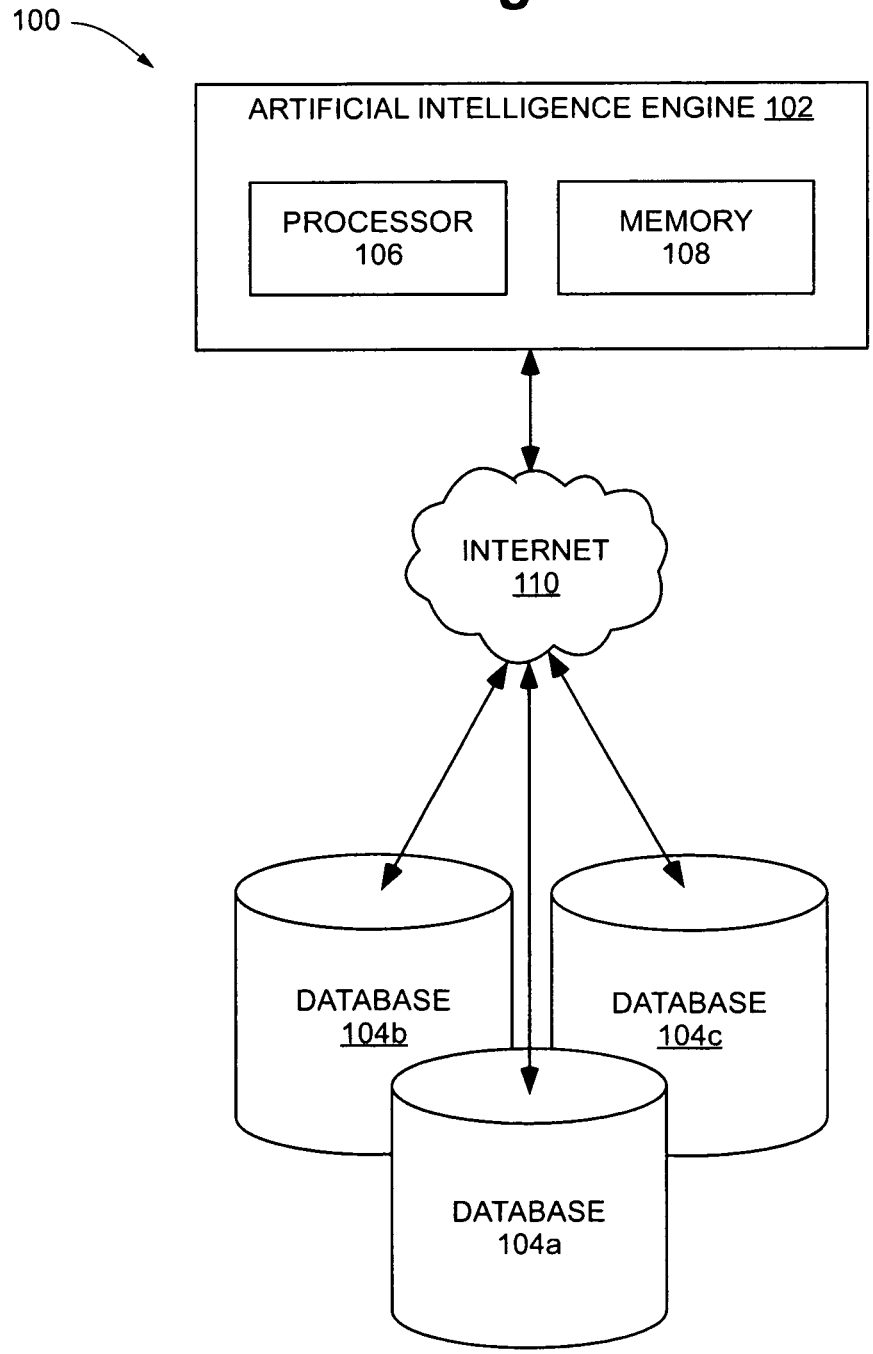
FIG. 1 is a block diagram of a semantic engine system, according to an embodiment.

While embodiments are amenable to various modifications and alternative forms, specifics thereof have been shown by way of example in the drawings and will be described in detail. It should be understood, however, that the intention is not to limit subject matter hereof to the particular embodiments described. On the contrary, the intention is to cover all modifications, equivalents, and alternatives falling within the spirit and scope of subject matter hereof in accordance with the appended claims.

DETAILED DESCRIPTION OF THE DRAWINGS

Referring to FIG. 1, a block diagram of a system 100 for semantically analyzing digital information is depicted, according to an embodiment. System 100 generally comprises a semantic engine 102 and one or more databases 104.

The system includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

According to an embodiment, the components of semantic engine 102 can be located in a singular "cloud" or network, or spread among many clouds or networks. End-user knowledge of the physical location and configuration of components of semantic engine 102 is not required. In an embodiment, semantic engine 102 generally includes processor 106 and memory 108. Semantic engine 102 embodies the computation, software, data access, and storage services that are provided to users over a network.

Semantic engine 102 generally includes processor 106 and memory 108. Processor 106 can be any programmable device that accepts digital data as input, is configured to process the input according to instructions or algorithms, and provides results as outputs. In an embodiment, processor 106 can be a central processing unit (CPU) configured to carry out the instructions of a computer program. Processor 106 is therefore configured to perform at least basic arithmetical, logical, and input/output operations.

Memory 108 can comprise volatile or non-volatile memory as required by the coupled processor 106 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

As depicted in FIG. 1, system 100 comprises three databases 104a-c. However, one skilled in the art will readily appreciate that additional or fewer databases can be utilized. As depicted in FIG. 1, semantic engine 102 can interface with databases 104 via processor 106. Specifically, processor 106 can execute database-specific calls to store and retrieve data from databases 104. Each of databases 104 can each comprise any organized or non-organized collection of data. In embodiments, databases 104 can each comprise simple non-volatile memory as part of a computer. In embodiments, databases 104 can each comprise database management systems such as Oracle, IBM DB2, or Microsoft SQL Server, for example. In embodiments, each of databases 104 comprises a plurality of databases.

In an embodiment, one of databases 104 can comprise a dictionary or thesaurus set of data. As will be described, a general, custom, or specialized dictionary can be utilized as an input to semantic engine to obtain the meaning of a word. In an embodiment, a thesaurus can be utilized to obtain synonyms for a word, which can be further used in processing. In another example, database 104 can also represent a singular input to semantic engine 102, as will be described. For example, a single text-based input can be operably coupled, transmitted, or otherwise received by semantic engine 102.

Though not depicted in FIG. 1, it is readily understood that semantic engine 102 and/or its subcomponents comprise input/output controllers and hardware including one or more network interface devices for interfacing to networked hardware such as databases 104. In embodiments, one or more communication channels can therefore operably couple semantic engine 102 to one or more of databases 104. The communication channels can be wired or wireless and be implemented according to any suitable protocol, such as Internet Protocol (IP), Wi-Fi, or any other appropriate format for the respective application.

As depicted in FIG. 1, system 100 further comprises a network channel over the Internet 110. In an embodiment, semantic engine 102 can be operably coupled to Internet 110, which can respectively be coupled to one or more databases 104. As such, databases 104 can represent data accessible over the Internet and not necessarily organized on a single database or other data structure. In other embodiments, only one or less than all of the plurality of databases 104 are accessible over Internet 110. In those embodiments, semantic engine 102 can be private to system 100 such that it is not accessible over Internet 110. One skilled in the art will readily appreciate that the architecture depicted in FIG. 1 is for illustration purposes only.

Figure 2:
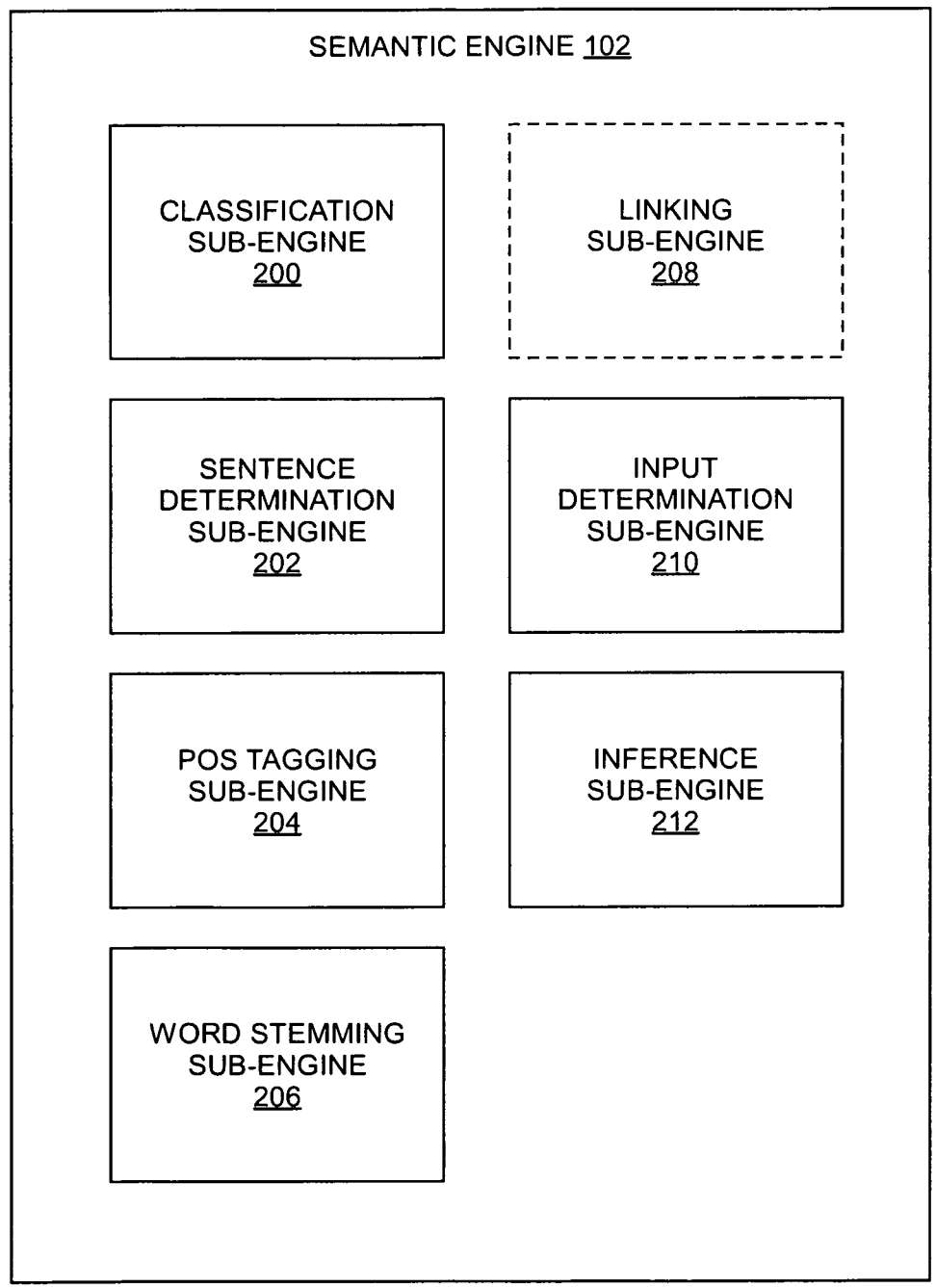
FIG. 2 is a block diagram of a semantic engine including various sub-engines, according to an embodiment.

Referring to FIG. 2, a block diagram of a semantic engine 102 is depicted, according to an embodiment. Semantic engine 102 generally comprises a classification sub-engine 200, a sentence determination sub-engine 202, a POS tagging sub-engine 204, a word stemming sub-engine 206, an optional linking sub-engine 208, an input determination sub-engine 210, and an inference sub-engine 212. In other embodiments, additional or fewer engines or sub-engines can be implemented, as will be readily understood. Moreover, the responsibilities or execution instructions for any of the respective engines can be combined with any other engine as appropriate.

Classification sub-engine 200 is generally configured to determine a classification from the entire domain chain (e.g. global to specific). Classification sub-engine 200 is further configured to determine concepts in the given digital material.

Sentence determination sub-engine 202 is generally configured to determine a type of sentence for every sentence in an input text or digital material. For example, sentence determination sub-engine 202 is configured to examined to determine whether the sentence is declarative, imperative, interrogative, or exclamatory.

In an embodiment, executing the sentence-breaking process to break the text into meaningful sentences is accomplished by the following two steps: First, determining complete sentences using the punctuation of the sentence. Generally, a period means a complete sentence, but there are outliers to this rule when dealing with terms and abbreviations. Second, determining complete meaning using the structure of the sentence comes after the initial breaking of the sentence in the first step, as the Part of Speech is required for this step.

POS tagging sub-engine 204 is generally configured to tag each of the words of a sentence and store that data. POS tagging sub-engine 204 breaks each word in the sentence to the classes of speech such as verb, noun, adjective, etc. Word tagging can be conducted on both an input text and/or a database of digital material. An algorithm can be executed to loop through the sentences and, for each sentence, break the sentence into words.

Word stemming sub-engine 206 is generally configured to stem the words of a sentence to their respective original case. In an embodiment, word stemming sub-engine 206 is configured to preserve the tense and count of each word. The stemming process returns the word to its singular present form to make it easier to extract the meaning of the word from any integrated dictionaries.

In an embodiment, word stemming sub-engine 206 is configured to to return the words in the sentence to their original state, while at the same time saving the word position in the sentence and the original word dynamics (for tense and plurality). The stemming process might discard important letters in the word, therefore another step is required which is the verification of the word itself. For example, applying stemmed word verification using spell-checking can be utilized. Spellchecking is conducted by looking up the word in the dictionary (as will be described in relation to linking sub-engine 208. A word is considered correctly spelled if it is found in the dictionary and the original word (non-stemmed) can be a derivative of the stemmed word, derivatives include plural, singular and tenses (past, present, future, etc.).

Linking sub-engine 208 is generally configured to be operably coupled to a database to facilitate word analysis. For example, and referring to both FIGS. 1 and 2, linking sub-engine 208 can be operably coupled to database 104c. In an embodiment, as described above, database 104c can comprise a custom or specific dictionary or thesaurus based on the classification results from classification sub-engine 200. Linking sub-engine 208 can therefore be utilized for word meaning or synonym lookup as part of the word analysis. Linking sub-engine 208 can be operably coupled to any other suitable database for other appropriate word analysis.

Input determination sub-engine 210 is generally configured to determine any actions or reactions from the input text and determine concepts contained in the input text.

Inference sub-engine 212 is generally configured to combine the other aforementioned sub-engines to derive an allocation between sentences. In an embodiment, a combination of these engines and processes are utilized to generate the output of the inference sub-process functions.

Figure 3:
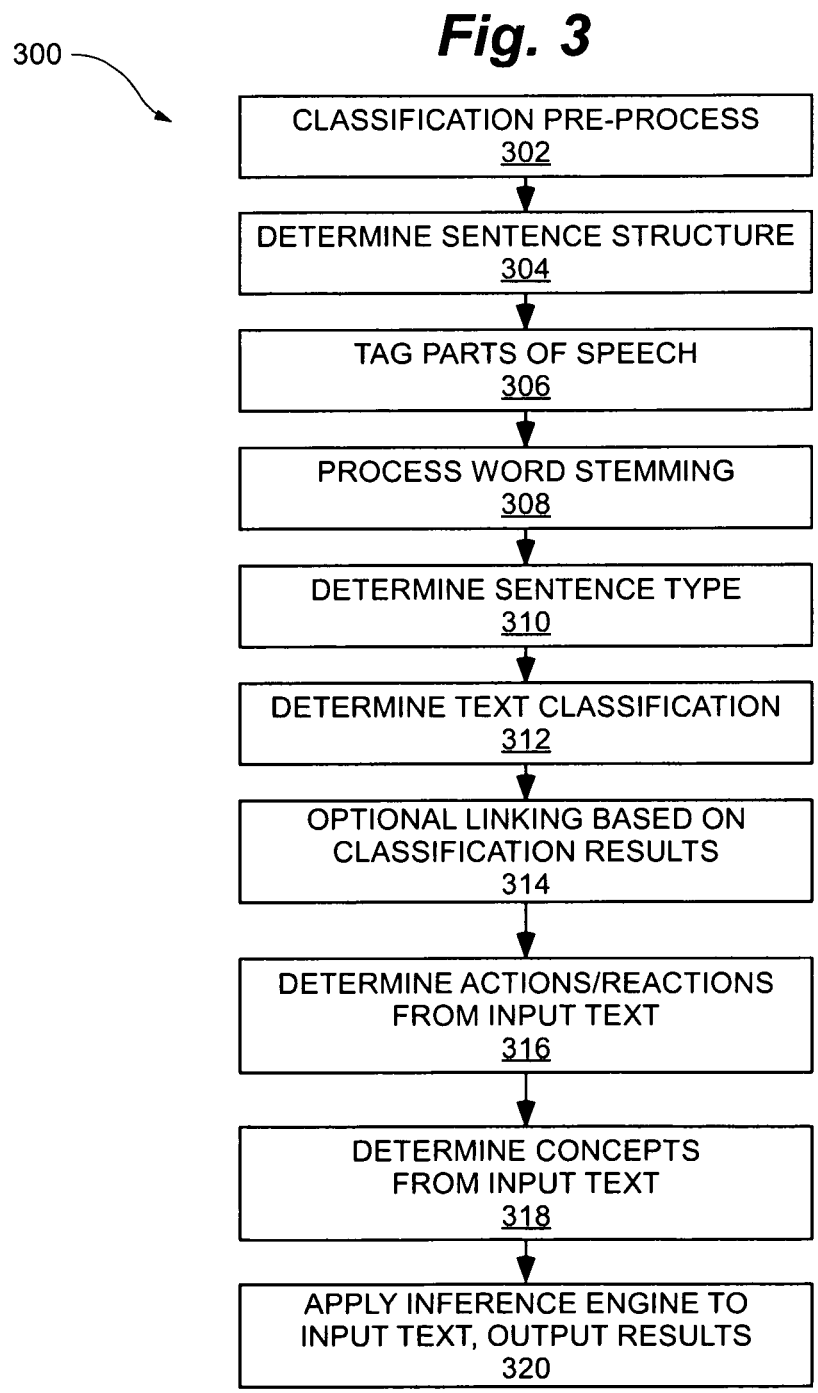
FIG. 3 is a flowchart of a method for semantically analyzing digital information, according to an embodiment.

Referring to FIG. 3, a flowchart of a method 300 for semantically analyzing digital information is depicted, according to an embodiment. Referring also to FIGS. 1 and 2, method 300 can be implemented by, for example, semantic engine 102. Method 300 is depicted according to one embodiment. Another embodiment of a method 400 for semantically analyzing digital information will be described with respect to FIG. 4.

Method 300 generally comprises a classification pre-process 302. In an embodiment, classification pre-process 302 is configured to load semantic engine 102 with classification information. For example, classification pre-process 302 can utilize Bayesian logic to attach multiple classifications (main & sub) classifications to a given WIKIPEDIA article. In an embodiment, such classification includes reading the corpus data and running the Bayesian algorithm (Naive Bayes) to store the classifications. Storage of the classification data can be in any suitable operably coupled database, or in memory 108 as appropriate. In an embodiment, and referring to FIG. 2, classification sub-engine 200 is configured to perform classification pre-process 302.

Referring to elements 304-320, a main process is instantiated after classification pre-process 302. At 304, a sentence structure determination is made. In an embodiment, and referring to FIG. 2, sentence determination sub-engine 202 is configured to perform sentence structure determination 304.

At 306, the parts of speech are tagged. In an embodiment, and referring to FIG. 2, POS tagging sub-engine 204 is configured to perform parts of speech tagging 306.

At 308, word stemming process is conducted. In an embodiment, and referring to FIG. 2, word stemming sub-engine 206 is configured to perform word stemming process 308.

At 310, a sentence type determination is made. In an embodiment, and referring to FIG. 2, sentence determination sub-engine 202 is configured to perform sentence type determination 310.

At 312, a text classification determination is made based on the classifications made in pre-process 302. In an embodiment, and referring to FIG. 2, input determination sub-engine 210 is configured to perform text classification determination 312.

At 314, a linking to one or more outside sources can optionally be made. In an embodiment, general and/or custom dictionaries can be utilized based on the classification results of 312. In an embodiment, and referring to FIG. 2, linking sub-engine 208 is configured to perform linking 314.

At 316, any actions or reactions are determined from the input text. In an embodiment, and referring to FIG. 2, input determination sub-engine 210 is configured to perform action/reaction determination 316.

At 318, concepts are determined from the input text. In an embodiment, and referring to FIG. 2, input determination sub-engine 210 is configured to perform concept determination 318.

At 320, inference sub-engine 212 can be applied to the input text. For example, the Excitement Open Platform (EOP) is a generic architecture and a comprehensive implementation for textual inference. Embodiments can utilize such a platform and provide further functionality as described herein.

An output can subsequently be generated. In an embodiment, an output comprises at least one of a determination of a classification from the entire domain chain, a determination of concepts found in the given digital material, a determination of at least one inference (for example, how the body of matter is related within the context), a deduction of knowledge obtained, for useful, applicable, pragmatic analyses, leading to intuitive, validated predictions, an extraction of answers for a question to the given material, or a summary of the compilation. One skilled in the art will readily appreciate that other outputs are possible.

Therefore, in contrast to "Semantic Content Management for Enterprises and the Web" by Sheth et al., embodiments utilize the semantic understanding from the meaning of respective sentences, not by looking at specific keywords. According to embodiments, a linked dictionary can be utilized to obtain the meaning of the words in each sentence, provide a weighting schema to yield concepts, and provide overall understanding of the sentence instead of simplistically tagging specific keywords.

In contrast to U.S. Patent Application Pub. No. 2014/0032574 to Kahn, embodiments are configured to extract the concept of the sentence to derive an overall meaning based on the understanding of the words forming the sentence and chains the grouping/categories of that sentence within the context of the entire document.

In contrast to U.S. Patent Application Pub. No. 2013/0138665 to Hu, embodiments are configured to identify the meaning of respective words, any synonyms of the word, and subsequently compare the concepts and overall meaning to provide similarities and differences.

Figure 4A:
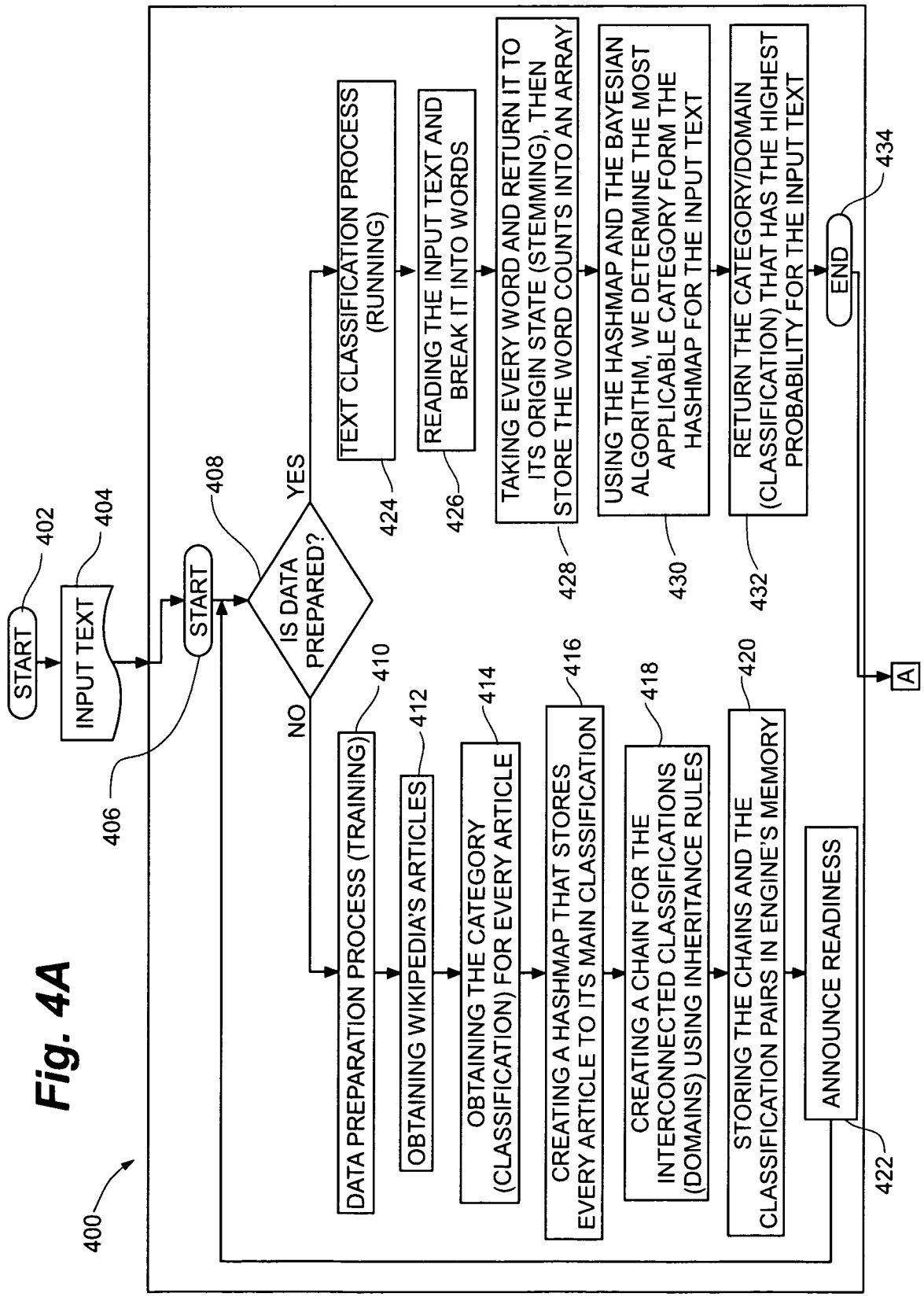
FIGS. 4A and 4B are flowcharts of a method for text classification, according to an embodiment.
Figure 4B:
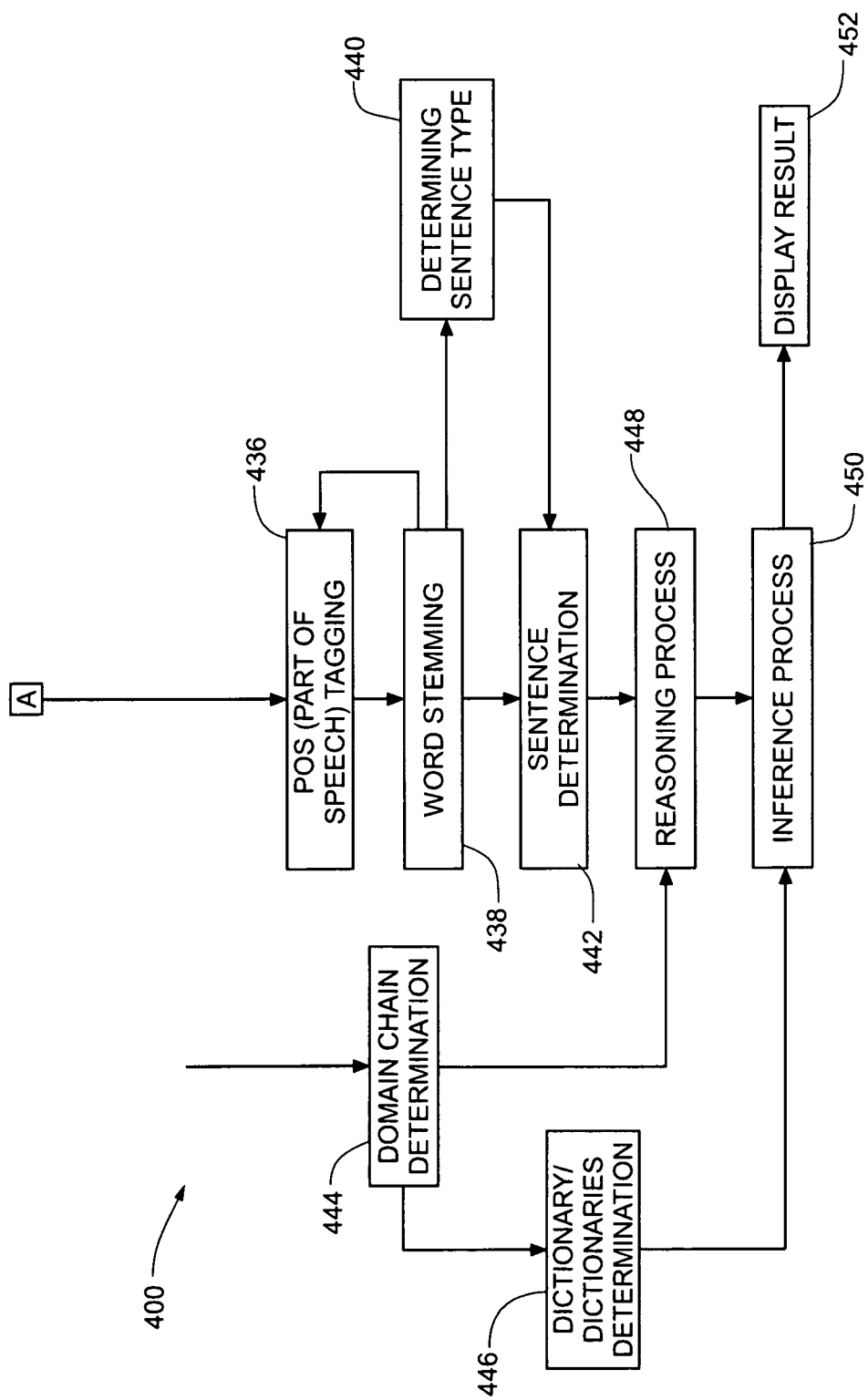

Referring to FIGS. 4A and 4B, flowcharts of a method 400 for text classification are depicted, according to an embodiment. Referring also to FIGS. 1 and 2, method 400 can be implemented by, for example, semantic engine 102. Method 400 begins at Start 402. At 404 an input text is provided to semantic engine 102.

From 404, method 400 proceeds to Bayesian Engine Start 406. At 408, a decision point is entered as to whether data has been previously prepared. If data has not been previously prepared at 408, method 400 proceeds to pre-process classification.

In an embodiment, as depicted in FIG. 4A, pre-process classification comprises 410-422. At 410, data preparation process or training is initiated for the text classification engine. At 412, WIKIPEDIA articles are obtained. In another embodiment at 412, other resource and sub-resource definitions can be utilized. One skilled in the art will readily appreciate that any number of resource databases can be utilized for classification context. At 414, a category or classification is obtained for every article. At 416, a hashmap is created that relates every article to its main or primary classification. In an embodiment, the hashmap is an advanced data structure approach to associate keys to values in an associative array and is optimized for speed such that obtaining the results of a specific key is in real-time or near real-time when working with large sets of data. In other embodiments, other suitable data structures can likewise be utilized. At 418, a chain for interconnected classifications (domains) is created using inheritance rules. In an embodiment, inheritance rules can be predefined. In other embodiments, a user can generate inheritance rules for the particular classification application. At 420, classification chains are stored in semantic engine 102 memory. In embodiments, classification pairs are further stored in semantic engine 102 memory. At 422, the pre-process classification is announced as ready or complete.

If data has been previously prepared at 408, method 400 proceeds to a "main process" beginning with text classification process 424. In an embodiment, if the pre-process classification 410-422 has already prepared data, it does not need to run at the time of the execution, as the results are already cached or stored in semantic engine 102 itself. Semantic engine 102 set up to be in a service-mode, wherein the first time it runs (usually one time only), it loads all the classification information, and then it has this information stored in a hash-map stored in its process (usually in the server's RAM). When a classification is requested, it is sent to the service process in a request type of transaction (using a specific port and arguments) and the input is then processed in the engine and the results are sent back via the same channel (synchronous call).

In general, the main process executes by first transmitting the input text to the semantic engine 102, along with an argument specifying a requested operation. According to an embodiment, the argument specifying a requested operation can be a at least one of a text classification request, a concept extraction request, an answer question request, a text abstraction request, or an inference (comparison) request.

At 424, the input text of 404 is sent as a call to the text classification service process. When the text classification service process receives the call, it triggers and applies the text classification process and returns the result back to the main process. At 426, the input text of 404 is read in and parsed or otherwise broken down into words. At 428, every word is considered and returned to its origin state (stemming). Word counts are then stored in a suitable data structure, such as an array. At 430, using the hashmap created at 416, and an algorithm, the most applicable category from the hashmap is determined for the input text. In an embodiment, the algorithm comprises a Bayesian algorithm. At 432, the category or domain classification that has the highest probability for the input text is returned. At 434, the text classification portion ends.

Referring to FIG. 4B, from 434, method 400 proceeds to POS tagging 436 of the comparison data for the input text. POS tagging 436 applies tags to the words of the sentence to determine the structure of the sentence. Referring now to FIG. 5, POS tagging 436 is further described with a flowchart of a method 436 for part-of-speech tagging.

For example, POS tagging 436 begins at Start 502. At 504, a sentence is entered. For example, the sentence can be entered into or received by POS tagging sub-engine 204. At 506, POS tagging 436 parses or otherwise breaks the sentence into words. At 508, each word is then subjected to the dictionary. As depicted in FIG. 5, in an embodiment, a general dictionary 510 can be incorporated. In other embodiments (not shown), specialized or additional dictionaries can be incorporated. At 512, possible or potential classifications are determined. At 514, classifications are examined against the structure of the sentence. If this analysis fails or returns a false indication, the next possible class is examined until the proper class is determined.

Referring again to FIG. 4B, method 400 proceeds to word stemming 438. In embodiments as shown, method 400 can iterate from word stemming 438 back to POS tagging 436.

At 440, from word stemming 438, a sentence type determination is made. At 442, the output of the determination of sentence type is generated. In general, a sentence type can be determined based on the structure of the sentence. Further, based on the meanings founds in the words of the sentence, and the sentence type, the weight of the sentence is determined, and the concept of the sentence is obtained. The concept is determined by the overall meanings of the words and their synonyms for the sentence. In particular, a sentence is a combination of words, and each of these words has a specific class: Noun, Verb, Participle, Article, Pronoun, Preposition, Adverb, and Conjunction.

When weighing the words of a sentence, nouns are preserved as the entities that will carry an action, or be carried by an action. In an embodiment, this is important in determining how the noun affects the overall meaning of the sentence. The meaning of the noun is not to be used literally, but to be used in the context. Thus, the use of the noun makes a significant difference to the engine because (for example) the noun (John) does not have a representation of the meaning of word (John), but rather a meaning of a (Person, Male, etc. . . . ), since in most cases the same noun will appear, or a substitute of the noun (he/she/etc. . . . ). In an embodiment, the process determines and relates these words back to the original noun, and not their literal meaning. The verbs carry most of the weight (and the meaning) as the verbs determine the actions in the sentence.

In an embodiment, after each sentence is processed, another algorithm can be executed to determine the overall meaning (context) of the entire input text, which runs for all of the sentences to weigh the sentences based on the concordance to the input text, the structure of the sentence, and the meaning of the sentence.

The aforementioned sentence determinations can be then input into reasoning process 448.

In parallel, at 444, a domain chain determination is made at 444. Domain change determination can be input to reasoning process 448. Further, a dictionary determination can be made at 446. Such dictionary determination can be input into inference process 450.

At 448, a reasoning process is conducted. For example, the reasoning sub-engine can be configured to combine the logical inheritance between the main domains and their sub-domains (in the fashion of a parent→child or a genus→species) and the concepts extracted from the input text to genuinely link the concept to the nearest domain level (in terms of the entire patent/child series) to identify the exact sub-domain/category the concept would fall into.

Figure 6:
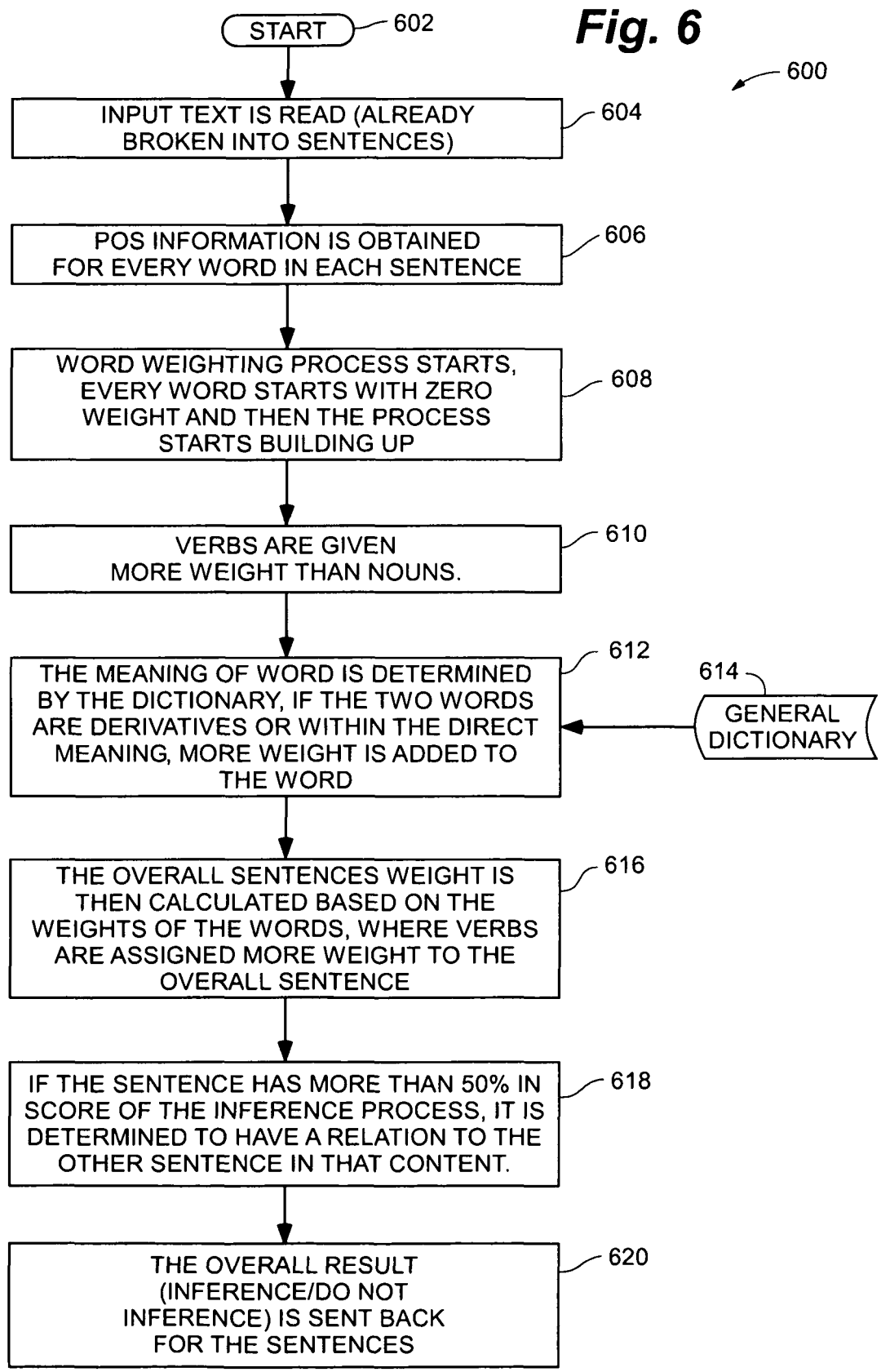
FIG. 6 is a flowchart of a method for an inference determination, according to an embodiment.

At 450, method 400 proceeds to inference process 450. Referring to FIG. 6, a flowchart of a method 600 for an inference determination is depicted, according to an embodiment. The inference process, at its core, determines the relation between sentences for the given context based on the overall weight for the sentences. The weighting and relations between the sentences can be determined by the applicability of those words in the sentences. If the words have related meanings, are synonyms, or can be derivate, the sentences would inference and therefore they are related and applicable to the context of the content.

Portions of inference process 600, as illustrated between FIGS. 4A-4B and FIG. 6, can overlap depending on the application. For example, inference process 600 can include POS tagging, word weighting, and dictionary incorporation. In other embodiments, those processes or components of those processes are implemented discretely as individual steps within method 400.

At 602, an embodiment of an inference process 600 is initiated or started. At 604, an input text is read. According to an embodiment, at 604, the input text has already been broken into sentences. At 606, POS information is obtained for every word in every sentence. At 608, word weighting is conducted. According to an embodiment, every word starts with zero weight and a weight is subsequently built up. For example, at 610, verbs are given more weight than nouns. At 612, the meaning of every word is determined by an operably coupled dictionary 614. In an embodiment, if two words are derivatives or within a direct meaning, more weight is added to the word. At 616, the overall sentence weight is then calculated based on the weights of the word, wherein verbs are assigned more weight to the overall sentence. At 618, if a sentence has more than 50% in a score of the inference process, it is determined to have a relation to the other sentence in the context. At 620, the overall result (for example, inference/no inference) is sent back for the sentences. According to an embodiment, word weighting process comprises both a logical and statistical process. For example, the type of the sentence determines the initial weighting of the sentence, then the verbs inside the sentence have more weight in the process. When comparing the two sentences, the concepts are extracted, and the categorization of the sentences is determined. If the categorization is similar, and the equated meaning and concept of the sentences is similar (for example, 50% similar or more) then the sentences can be inferred and therefore they are similar. In other embodiments, similarity percentages can be greater than or less than 50%, depending on the application and text content.

In an embodiment of the inference engine process, an algorithm is configured to iterate through the sentences and determine the meaning of the sentences and the overall meaning of the input text. In embodiments, the inference engine process further determines the concepts contained within each sentence, or group of sentences. The Inference engine uses the weights of the sentences to determine the sentences with the higher weights to be used in the inference process.

After running through the sentences and determining the concepts, the concepts are also run through the inference engine to determine which concept has the most weight towards to the entire input text, giving ranking to the concepts in order to prepare for the output.

In an embodiment, the inference engine performs an additional step to determine an action/re-action, where based on the ranking of the concepts, and the type of the sentence, the action/re-action information is determined.

Any output information is thus combined and sent to another algorithm or engine which determines the format of the output. For example, an output sub-engine can be utilized.

Referring again to FIG. 4B, at 452, a result is displayed. Depending on the requested operation, the output can be returned in myriad ways. For example, in a Text Classification Request, the input text is sent to semantic engine 102 and semantic engine 102 determines the text classification information (Bayesian Engine), and then the result is inferred in the inference engine to get the most logical result (based on the weights of the sentences contained in the text and the results chain that is obtained from the Bayesian Engine). More particularly, in an embodiment, if the requested output is text classification only, the text classification result is compared with the semantic concepts, and then inferred to the input text. The classification categories with the highest weights will be output by semantic engine 102.

In another example, in a Concept Extraction Request, the input text is sent to semantic engine 102 and semantic engine 102 determines the concepts in the text, ranked by the concept with the higher weight and returns the results back as a response to the request. More particularly, in an embodiment, if the requested output is the concepts, the concepts that were obtained by the inference engine are then displayed. In an embodiment, the concepts can be displayed by weighting order (maximum to minimum).

In another example, in an Answer a Question Request, the input text and a question (in natural language) is sent to semantic engine 102, wherein semantic engine 102 processes the text, extracts the concepts, and then processes the question and extracts the concepts. After this is complete, semantic engine 102 infers the concepts in the text to the concept in the question and then returns the sentence that has the highest ranking for the inferred concept that matched the concept in the question. More particularly, in an embodiment, if question answering is requested, semantic engine 102 will accept two inputs; the text that contains the information, and the question. Semantic engine 102 can then apply the same steps for the question and the text, and create a sentence to text inference between the question and the text. In an embodiment, the sentence with the maximum weight will be output as the result.

In another example, in an Abstract Text Request, the input text is sent to semantic engine 102 and semantic engine 102 determines the concepts in the input text, and then responds with the sentences that have the highest inference of the concepts that have the maximum weights of the input text. More particularly, in an embodiment, if text abstraction is requested, semantic engine 102 can determine the concepts found in the sentences and extract the sentences with the concepts of the highest weight as an output of semantic engine 102.

In another example, in an Inference Result Request, two input texts are sent to semantic engine 102, and semantic engine 102 creates the concepts for each of the input texts individually, then semantic engine 102 responds back with the determination of whether these input texts can inference (have the same concept) or not. In an embodiment, a percentage of the inference level can relay that 0% means no inference at all, and 100% means a full inference. More particularly, in an embodiment, if an inference is requested, two input texts can be applied. Subsequently, semantic engine 102 will output the result of the inference of the two input texts. In an embodiment, semantic engine 102 is capable of creating three inference results: sentence to sentence inference, sentence to text inference, and text to text inference (overall).

As described herein, embodiments of the semantic engine can utilize a Bayesian Algorithm in the primary categorization method. Embodiments have applied a semi-supervised parameter estimation into the algorithm of the engine. This technique is used for constructing classifiers, or models that assign class labels to instances that are represented as vectors of feature values. These feature values identify the content categories.

The NB engine is a conditional probability model, that when given an instance to be classified, the Bayesian probability algorithm is $$P(A \mid B) = \frac{P(B \mid A)P(A)}{P(B)}$$

where A and B are the events, P(A) and P(B) are the probabilities of A and B being independents of each other, P(A|B) is the probability of A given that B is true, and P(B|A) is the probability of B given that A is true.

This simple algorithm is applied to the Naïve Bayes where the goal is to get to the equation $$posterior = \frac{prior \times likelihood}{evidence}.$$

In terms of an algorithm it becomes $$p(C_k \mid x) = \frac{p(C_k) \, p(x \mid C_k)}{p(x)}$$

and using a chain rule, this algorithm becomes $$p(x_i \mid C_k, x_j) = p(x_i \mid C_k),$$

$$p(x_i \mid C_k, x_j, x_k) = p(x_i \mid C_k)$$

$$p(x_i, C_k, x_j, x_k, x_l) = p(x_i \mid C_k),$$

And so on, for i≠j k, l. The joint model is expressed as $$p(C_k \mid x_1, \ldots, x_n) \propto p(C_k, x_1, \ldots, x_n)$$

$$\propto p(C_k)p(x_1 \mid C_k) \, p(x_2 \mid C_k) \, p(x_3 \mid C_k) \ldots$$

$$\propto p(C_k)\prod_{i=1}^{n} p(x_i \mid C_k).$$

This means that using the above independence assumptions, the conditional distribution over the class variable C is:

$$p(C_k \mid x_1, \ldots, x_n) = \frac{1}{Z} p(C_k) \prod_{i=1}^{n} p(x_i \mid C_k)$$

Where the evidence Z=p(x) is a scaling factor dependent only on $x_1, \ldots, x_n$, that is, a constant if the values of the feature variables are known.

In an embodiment, a Bayes engine consists of the following components: a classifier, a knowledgebase, a feature stats, and a text tokenizer. In embodiments, the Bayes engine can be implemented in Java, although other coding implementations possible.

The classifier is the main class in the NB engine that runs the engine and starts the process of the tokenization for the given data set. The classifier is further configured to store the tokenized data set in the knowledgebase to extract the feature stats.

The classification process creates a hashing map for the strings and stores them in the knowledgebase after applying the tokenization process. In one embodiment, the knowledgebase is a set of hashmaps that store the probabilities for the words found in the text, for which probabilities can be assigned.

Text tokenization applies the algorithm of the NB semi-supervised training into action. For example, the text tokenization can read the contents of an article text and assigns the classification that was obtained from the categorization process.

Figure 7:
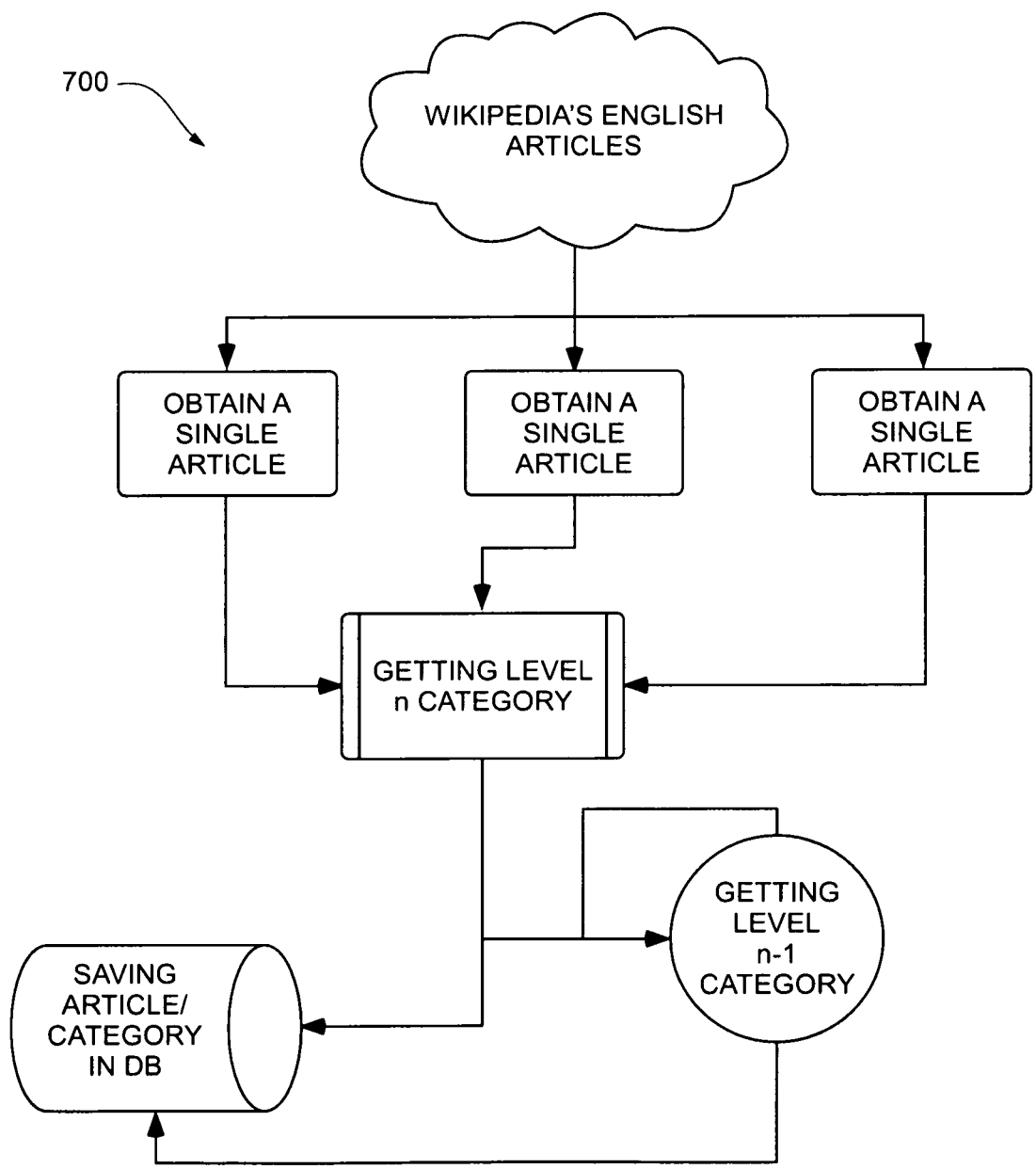
FIG. 7 is a flowchart of a method for obtaining article data, according to an embodiment.

With the semi-supervised estimation, the NB classifier is trained from the corpus data obtained from Wikipedia. A database can interface to the NB engine such that the engine can "scan" the database tables that we have with the Wikipedia's corpus data for the larger categories that are of interest, and subsequently lower categories. For example, referring to FIG. 7, a flowchart of a method 700 for obtaining article data is depicted, according to an embodiment. In an embodiment, a PostGreSQL database management system (DBMS) allows for indexing on the article titles and categories.

A linking of Resource Description Framework (RDF) rules with NB results can generate text context. In an embodiment, RDF is a metadata data model. The RDF is based on an XML structure with the serialization information integrated into the RDF structure. Embodiments can utilize RDF to produce the RDF/web ontology language (OWL) ontologies and linked data from natural language sentences. The text to classified or categorized is subjected to the RDF rules to generate the OWL and the RDF structure. Subsequently, the RDF/OWL information is parsed by a Java sub-process that extracts the classes from the RDF structure to obtain the classification that is of interest.

Figure 8B:
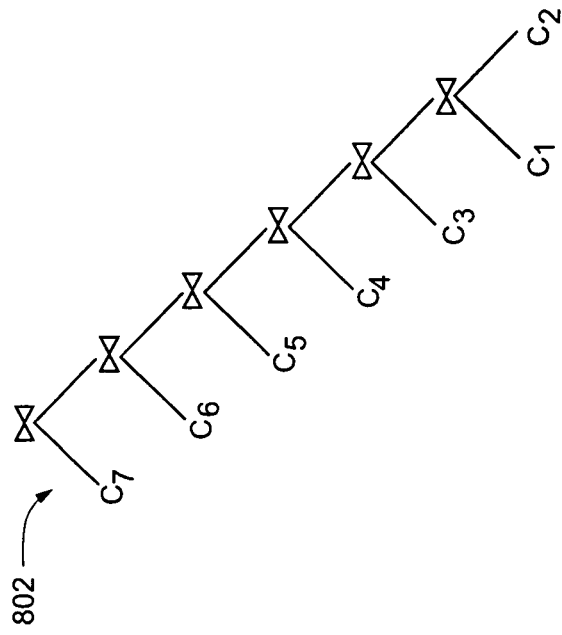
FIG. 8B is a diagram of a right-deep tree structure for an RDF, according to an embodiment.
Figure 8A:
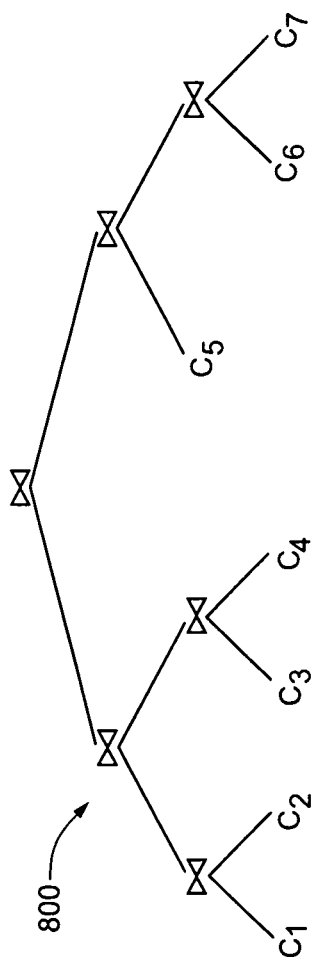
FIG. 8A is a diagram of a bushy tree structure for a Resource Description Framework (RDF), according to an embodiment.

In an embodiment, the RDF comes in two possible tree structures. For example, referring to FIGS. 8A and 8B, a bushy tree 800 and right-deep tree 802 are depicted as possible tree structures. In embodiments, a RDF Query Path Optimization technique can be utilized to traverse the respective trees.

Figure 9:
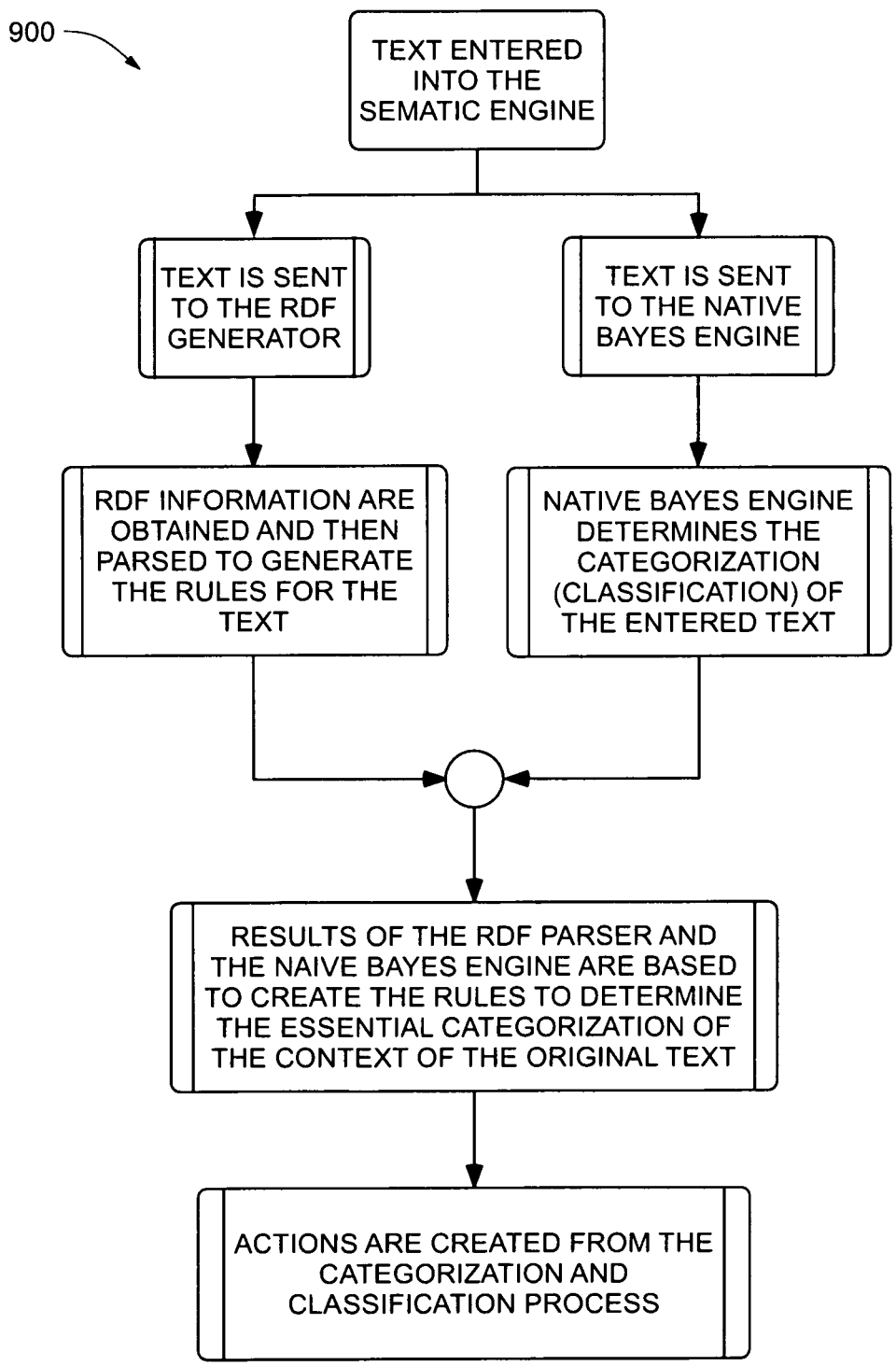
FIG. 9 is a flowchart of a method of an action generation from an input text, according to an embodiment.

Actions can be created based on the RDF rules with the NB engine. This results in a generation process that creates human-readable content. In an embodiment, such a process obtains the RDF rules and uses them to create an action (or an informative summary/content) based on the rules. The end result generally transforms the input text in an actionable format. For example, referring to FIG. 9, a flowchart of a method 900 of action generation from input text is depicted, according to an embodiment.

When the semantic engine obtains the results that come from the RDF rules and the NB engine categorization, the semantic engine traverses the knowledgebase for related information. These relationships determine the categorization, forming clear and easily human readable actions.

According to an embodiment, three steps are utilized to create this structure—obtaining the sentences that pertain to a certain category, generating text using a Markov chain model, and implementing text processing models.

Figure 10:
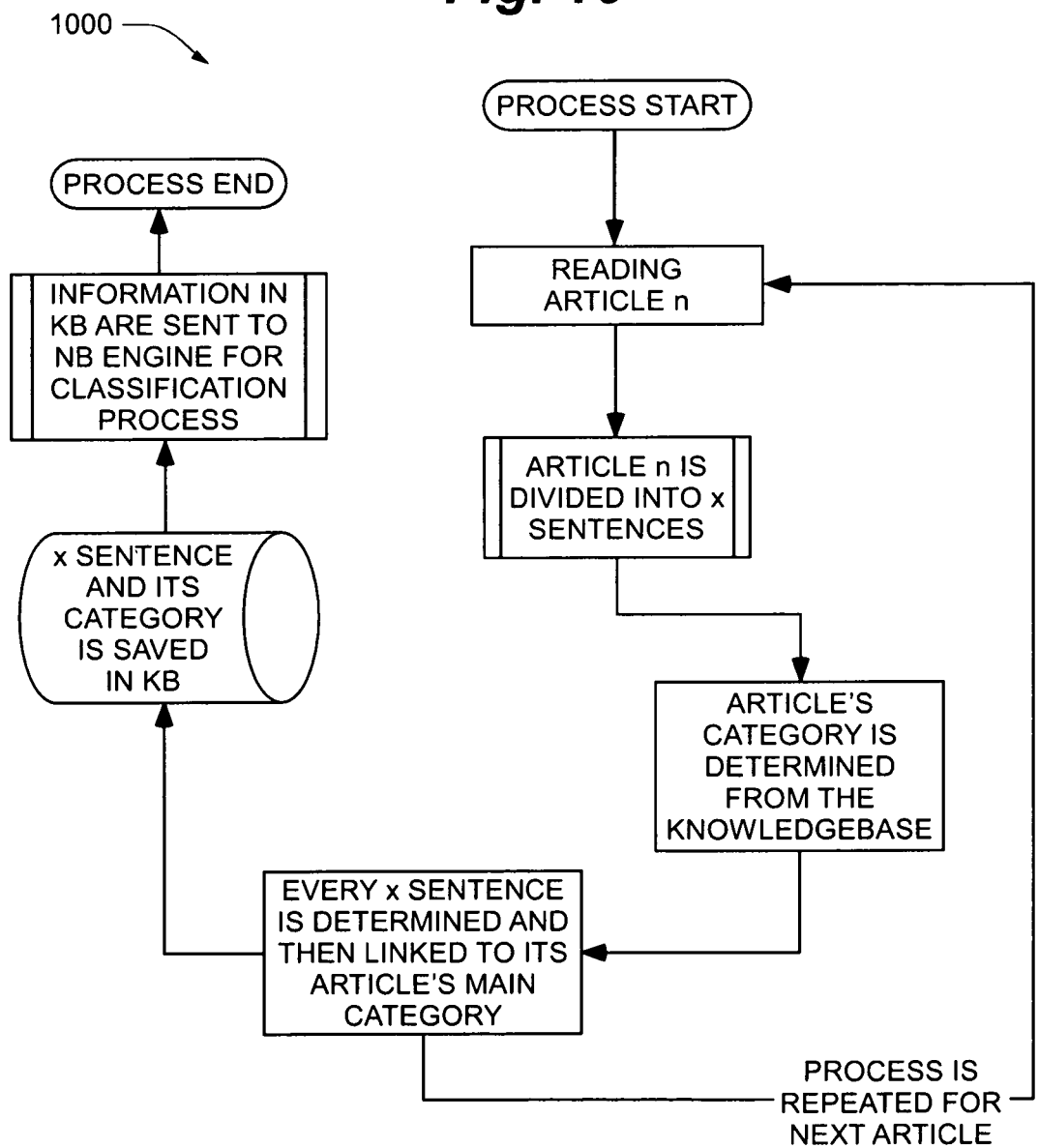
FIG. 10 is a flowchart of a method for parsing articles, according to an embodiment.

Referring first to obtaining sentences that pertain to a certain category, this sub-process is conducted to "read" the sentences contained in the database records for the article content. According to an embodiment, every article is then split into sentences. The sentences are then grouped into the same categories that were obtained for their original articles. Categories follow the same structure of parent-child and grandparent-grandchild to form an overall knowledgebase. Many of these sentences will become a hybrid sentence where it appears in most of the categories. Such sentences are eliminated from the knowledgebase if they fall within more than 40% of the grandparent categories. In other embodiments, other limiting level percentages can be utilized. Finally, the sentences are subjected to the NB engine to train this level of the NB for these sentences. In an embodiment, referring to FIG. 10, a flowchart of a method 1000 for parsing articles is depicted, according to an embodiment.

Referring next to generating text using a Markov chain model, the Markov chain model utilizes randomness and undergoes transitions from one state to another on a state space. The Markov chain model can possess a property that is usually characterized as "memoryless", i.e. the probability distribution of the next state depends only on the current state and not on the sequence of events that preceded it. The algorithm used in this model is a sequence of random variables x1, x2, x3 with the Markov property, given the present state, the future and past states are independent.

For example, where $Pr(X_{n+1}=x|X_1=x_1, X_2=x_2, \ldots, X_n=x_n)=Pr(X_{n+1}=x|X_n=x_n)$ if both conditional probabilities are well defined, if $Pr(X_1=x_1 \ldots, X_n=x_n)>0$.

Referring finally to implementing text processing models, such models can be implemented for increasing the readability and clarity of the generated text. In an embodiment, models can include a grammar checking sub-process and a spellchecking sub-process.

Various embodiments of systems, devices, and methods have been described herein. These embodiments are given only by way of example and are not intended to limit the scope of subject matter hereof. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized commensurate with the scope of subject matter hereof.

Persons of ordinary skill in the relevant arts will recognize that subject matter hereof may comprise fewer features than illustrated in any individual embodiment described above. The embodiments described herein are not meant to be an exhaustive presentation of the ways in which the various features of subject matter hereof may be combined. Accordingly, the embodiments are not mutually exclusive combinations of features; rather, the subject matter hereof may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims of subject matter hereof, it is expressly intended that the provisions of Section 112, sixth paragraph of 35 U.S.C. are not to be invoked unless the specific terms "means for" or "step for" are recited in a claim.

The invention claimed is:

1. A semantic engine for semantically analyzing digital information available via the Internet, the semantic engine comprising:
   a processor and memory operably coupled to the processor; and
   control logic to be executed by the processor and configured to
   selectively access a set of articles, the set of articles being published on the Internet and operably coupled to the processor over a network channel,
   classify the set of articles to create a set of classifications,
   generate a plurality of chains of relations between the set of classifications, the plurality of chains of relations comprising at least a primary classification linked to at least one other classification, wherein classifications in a particular chain of relations that are not directly linked but are related in the particular chain of relations, and store the plurality of chains of relations in a semantic database, the semantic database being operably coupled to the processor,
   receive an input text to be semantically analyzed, the input text comprising a set of words and sentences,
   train a Bayesian algorithm to classify the input text according to the set of classifications and the plurality of chains of relations,
   perform part-of-speech tagging on the input text to determine a part of speech for each of the set of words,
   examine a part-of-speech-tagged sentence to determine a sentence type,
   word-stem the input text to an original case for each word in the set of words including by storing each verb tense in memory, wherein each verb tense is related to time according to a past, present, or future tense,
   link a dictionary database to obtain the meaning for each word in the set of words, using the original case, each word verified using a respective verb tense for a respective sentence, the dictionary database being operably coupled to the processor over the network channel,
   perform an inference to derive a relation between the input text, the input text including sentence pairs of a first sentence and a second sentence and store the relation of whether the first sentence and the second sentence are related in the semantic database,
   apply the relation to the set of classifications, and
   execute an industry-specific task based on the derived relation and the application of the relation to the set of classifications, wherein the industry-specific task comprises evaluation of the input text over the Internet.

2. The semantic engine of claim 1, further comprising displaying a result of at least one of a classification of the entire domain chain, a concept found in the digital information, an inference related to the digital information, a prediction based on the digital information, an answer to a question related to the digital information, or a summary of the digital information.

3. The semantic engine of claim 1, wherein examining the part-of-speech-tagged sentence to determine the sentence type further comprises weighting the set of words in the sentence according to whether each of the set of words is classified as a noun, verb, participle, article, pronoun, preposition, adverb, or conjunction, and wherein a verb classification is the highest weight.

4. The semantic engine of claim 3, wherein performing the inference to derive the relation between the input text further comprises evaluating the weighting of each of the set of words.

5. The semantic engine of claim 1, wherein the control logic is further configured to determine at least one action and at least one reaction from the set of classifications, the at least one action defining a question, and the at least one reaction defining a response to the question.

6. The semantic engine of claim 1, wherein performing the inference to derive the relation between the input text comprises establishing a relation if the first sentence of the input text has more than a 50% score in relation to the second sentence.

7. The semantic engine of claim 1, wherein the set of classifications is stored in a hashmap relating every article to a classification.

8. A method for semantically analyzing digital information available via the Internet, the method comprising:
  selectively accessing a set of articles, the set of articles being published on the Internet;
  classifying the set of articles to create a set of classifications;
  generate a plurality of chains of relations between the set of classifications, the plurality of chains of relations comprising at least a primary classification linked to at least one other classification, wherein classifications in a particular chain of relations that are not directly linked but are related in the particular chain of relations, and storing the plurality of chains of relations in a semantic database, the semantic database being operably coupled to the processor,
  receiving an input text to be semantically analyzed, the input text comprising a set of words and sentences;
  training a Bayesian algorithm to classify the input text according to the set of classifications and the chains of relations;
  performing part-of-speech tagging on the input text to determine a part of speech for each of the set of words;
  examining a part-of-speech-tagged sentence to determine a sentence type,
  word-stemming the input text to an original case for each word in the set of words including by storing each verb tense in memory, wherein each verb tense is related to time according to a past, present, or future tense,
  linking a dictionary database to obtain the meaning for each word in the set of words using the original case, each word verified using a respective verb tense for a respective sentence;
  performing an inference to derive a relation between the input text, the input text including sentence pairs of a first sentence and a second sentence and storing the relation of whether the first sentence and the second sentence are related in the semantic database,
  applying the relation to the set of classifications, and
  executing an industry-specific task based on the derived relation and the application of the relation to the set of classifications, wherein the industry-specific task comprises evaluation of the input text over the Internet.

9. The method of claim 8, further comprising displaying a result of at least one of a classification of the entire domain chain, a concept found in the digital information, an inference related to the digital information, a prediction based on the digital information, an answer to a question related to the digital information, or a summary of the digital information.

10. The method of claim 8, wherein examining the part-of-speech-tagged sentence to determine the sentence type further comprises weighting the set of words in the sentence according to whether each of the set of words is classified as a noun, verb, participle, article, pronoun, preposition, adverb, or conjunction, and wherein a verb classification is the highest weight.

11. The method of claim 10, wherein performing the inference to derive the relation between the input text further comprises evaluating the weighting of each of the set of words.

12. The method of claim 8, further comprising determining at least one action and at least one reaction from the set of classifications, the at least one action defining a question, and the at least one reaction defining a response to the question.

13. The method of claim 8, wherein performing the inference to derive the relation between the input text comprises establishing a relation if the first sentence of the input text has more than a 50% score in relation to the second sentence.

14. The method of claim 8, wherein the set of classifications is stored in a hashmap relating every article to a classification.

15. A semantic engine for semantically analyzing digital information available via the Internet, the semantic engine comprising:
  a processor and memory operably coupled to the processor; and
  control logic to be executed by the processor and configured to
    selectively access a set of pages, the set of pages being published on the Internet and operably coupled to the processor over a network channel,
    classify the set of pages to create a set of classifications,
    generate a plurality of chains of relations between the set of classifications, the plurality of chains of relations comprising at least a primary classification linked to at least one other classification, wherein classifications in a particular chain of relations that are not directly linked but are related in the particular chain of relations, and store the plurality of chains of relations in a semantic knowledgebase, the semantic knowledgebase being operably coupled to the processor,
    receive an input text to be semantically analyzed, the input text comprising a set of words, sentences, and paragraphs execute a Bayesian algorithm to classify the input text according to the set of classifications and the plurality of chains of relations,
    perform part-of-speech tagging on the input text to determine a part of speech for each of the set of words,
    examine a part-of-speech-tagged sentence to determine a sentence type including by weighting the set of words in the sentence according to whether each of the set of words is classified as a noun, verb, participle, article, pronoun, preposition, adverb, or conjunction, and wherein a verb classification is the highest weight,
    word-stem the input text to an original case for each word in the set of words, wherein each verb tense is stored in memory and related to time according to a past, present, or future tense,
    link a dictionary database to obtain the meaning and synonym for each word in the set of words using the original case, each word verified using a respective verb tense for a respective sentence, according to the word part-of-speech classification, the dictionary database being operably coupled to the processor over the network channel,
    create sentence pairs by pairing each of the sentences in the input text with each of the other sentences in the input text, excluding the same sentence in a pair, perform an inference to determine a relation between each of the sentence pairs by inferring the first sentence in the pair to the second sentence semantically utilizing the semantic knowledgebase, including by establishing a relation if the first sentence of the input text has more than a 50% score in relation to the second sentence by applying the Bayesian algorithm to make a percentage determination, and deriving the relation for a subsequent step, apply the relation to the set of classifications, execute an industry-specific task based on the derived relation and the application of the relation to the set of classifications, wherein the industry-specific task comprises evaluation of the input text over the Internet, and display a result of at least one of a classification of the entire domain chain, a concept found in the digital information, an inference related to the digital information, a prediction based on the digital information, or a summary of the digital information.

* * * * *